(12) United States Patent
Lisec

(10) Patent No.: US 7,818,981 B2
(45) Date of Patent: Oct. 26, 2010

(54) DEVICE FOR CUTTING GLASS AND REMOVING COATING THEREFROM

(76) Inventor: Peter Lisec, Schlossstrasse 29, Amstetten-Hausmening (AT) A-3363

( * ) Notice: Subject to any disclaimer, the term of this patent is extended or adjusted under 35 U.S.C. 154(b) by 790 days.

(21) Appl. No.: 10/571,675

(22) PCT Filed: Feb. 26, 2004

(86) PCT No.: PCT/AT2004/000059
§ 371 (c)(1),
(2), (4) Date: Mar. 13, 2006

(87) PCT Pub. No.: WO2005/044746
PCT Pub. Date: May 19, 2005

(65) Prior Publication Data
US 2006/0283020 A1    Dec. 21, 2006

(30) Foreign Application Priority Data
Nov. 6, 2003 (WO) .................. PCT/AT03/00332

(51) Int. Cl.
*C03B 33/10* (2006.01)
(52) U.S. Cl. .......................................... 65/174; 83/886
(58) Field of Classification Search .................. 65/174; 83/886, 882, 883, 884
See application file for complete search history.

(56) References Cited
U.S. PATENT DOCUMENTS

| | | | | |
|---|---|---|---|---|
| 1,453,856 A * | 5/1923 | Rowley et al. | ................ | 225/96 |
| 2,736,380 A * | 2/1956 | Dillenburger | ................ | 225/96 |
| 4,057,881 A * | 11/1977 | Stephens | ................ | 29/27 C |
| 4,266,893 A * | 5/1981 | Troger et al. | ................ | 409/206 |
| 4,422,265 A * | 12/1983 | Branston | ................ | 451/147 |
| 4,593,731 A * | 6/1986 | Tanaka | ................ | 144/48.1 |
| 4,698,088 A * | 10/1987 | Bando | ................ | 65/174 |
| 4,945,958 A * | 8/1990 | Shoda | ................ | 144/1.1 |
| 4,989,486 A * | 2/1991 | Miller et al. | ................ | 83/499 |
| 5,449,312 A | 9/1995 | Lisec | | |
| 5,733,353 A * | 3/1998 | Bando | ................ | 65/174 |
| 5,888,268 A * | 3/1999 | Bando | ................ | 65/286 |
| 6,341,548 B1 * | 1/2002 | Hirahata et al. | ................ | 83/881 |
| 2004/0072514 A1 * | 4/2004 | Bando | ................ | 451/175 |
| 2004/0211219 A1 * | 10/2004 | Bando | ................ | 65/105 |

FOREIGN PATENT DOCUMENTS

EP    0 517 176    12/1992

* cited by examiner

*Primary Examiner*—Jason L Lazorcik
*Assistant Examiner*—Erin Snelting
(74) *Attorney, Agent, or Firm*—Young & Thompson

(57) ABSTRACT

On a carriage of a device for dividing glass sheets into patterns, there are a cutting tool to which a pivoting drive is assigned, and a stripping tool for removing a coating from a glass sheet with a stripping disk. The stripping tool is mounted on the carriage and pivots around an axis perpendicular to the glass sheet. When the tool is being used to strip a glass sheet along the division outline, therefore in the area on either side of scoring lines which have been or are to be produced in a glass sheet, the stripping disk is placed on the surface of the glass sheet and the tool is pivoted around the axis which is normal to the glass sheet using the pivoting drive for the cutting tool in order to correctly align the stripping disk.

20 Claims, 4 Drawing Sheets

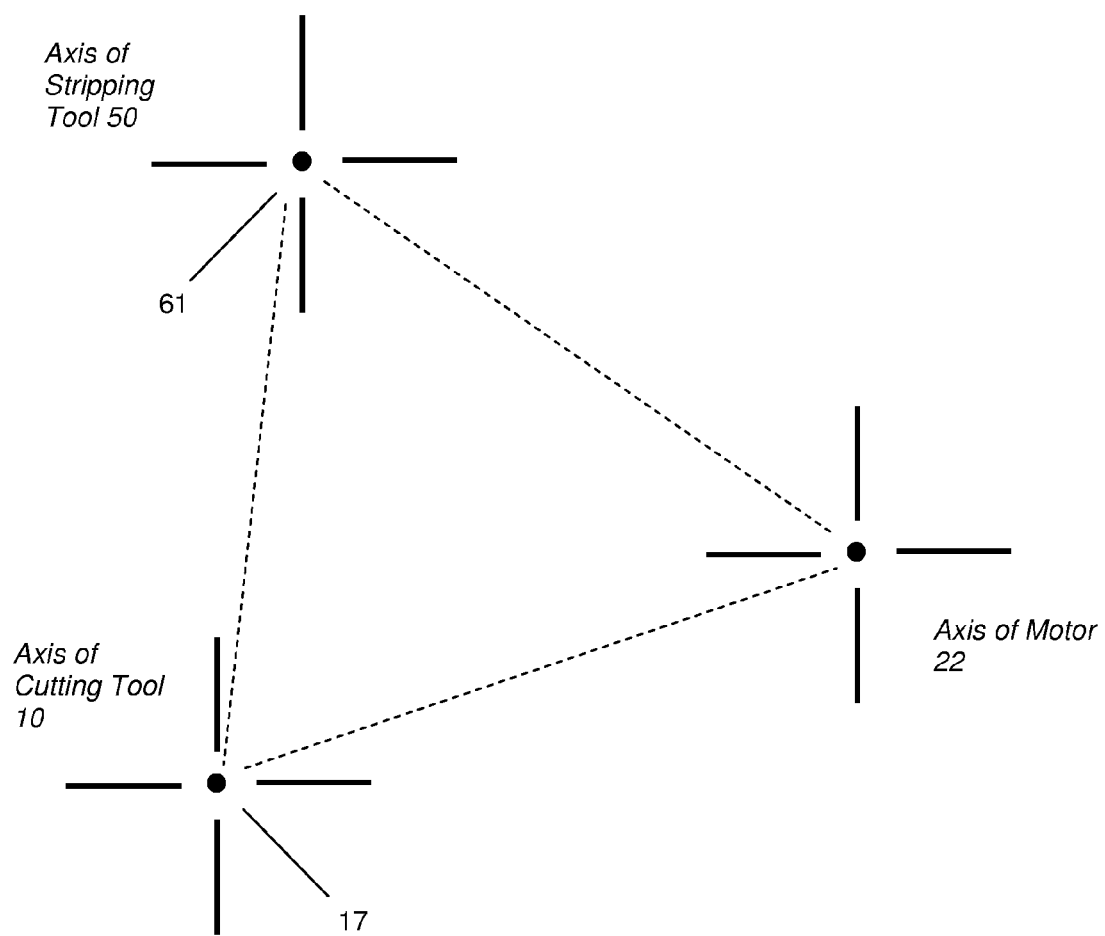

DEVICE FOR CUTTING GLASS AND REMOVING COATING THEREFROM

BACKGROUND OF THE INVENTION

1. Field of the Invention

Figure 1:
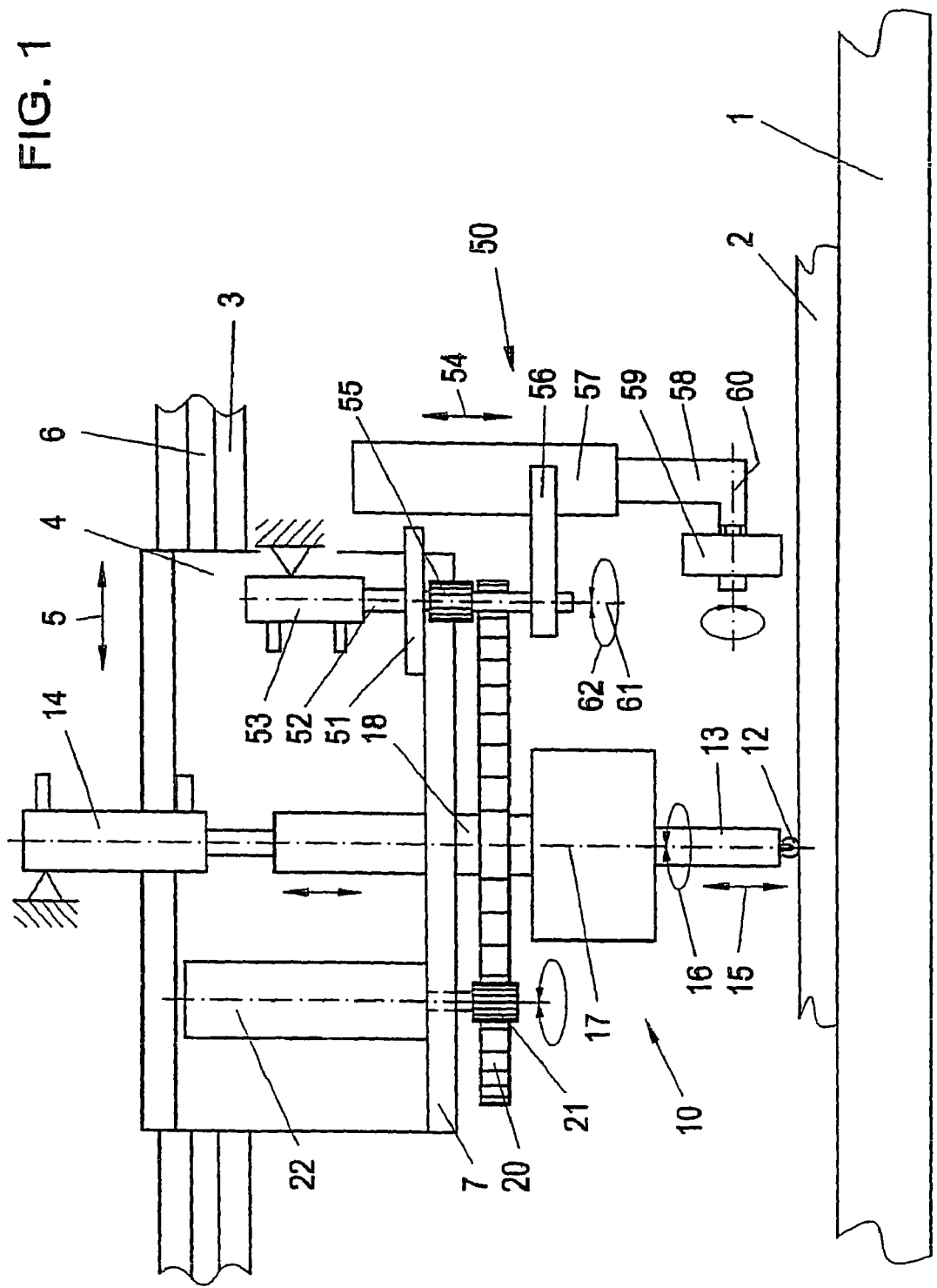

The invention relates to a device with the features of the introductory part of claim 1.

2. Description of the Related Art

Devices are known with which glass sheets which are provided with a coating (for example a metal coating) are divided and worked in the edge area of the resulting patterns for the purpose of removing the coating. Reference is made by way of example to EP 0 517 176 A and U.S. Pat. No. 5,449, 312 A (=EP 0 603 152 A). With these devices glass sheets can be abrasively worked along the division outline on either side of the cutting lines which are to be produced by working with a stripping tool, for example a grinding wheel (with a rubber-like consistency) such that (only) the coating is removed. After removing the coating on either side of the division outline, the glass sheet is scored ("cut") using a cutting wheel, whereupon conventionally the glass pane is then divided along the scoring lines which have been produced, by breaking, especially on breaking tables.

Removal of a coating from glass sheets is especially important when the glass sheets or patterns produced from them are to be used for producing insulating glass, since the cements (generally butyl rubber) which join the spacer frames to the glass sheets in insulating glass and which seal the interior against the environment, are poorly compatible with metal coatings.

The problem in the known device is that so-called shaped panes, therefore glass patterns with other than only straight outlines, cannot be worked or can only be worked awkwardly in the sense of stripping and cutting (scoring).

BRIEF SUMMARY OF THE INVENTION

The object of the invention is to provide a device with a simple structure, with which glass sheets with any outline shape, therefore so-called shaped panes, can be stripped and cut.

Since a stripping tool is also mounted in the device as claimed in the invention on a carriage which can travel on the beam of a cutting unit (glass cutting table) in addition to the cutting tool (cutting wheel), altogether a light structure results and for example the double beam known from U.S. Pat. No. 5,449,312 for the cutting bridge is no longer necessary.

It is furthermore advantageous that the pivoting drive for the stripping tool can be coupled to the pivoting drive for the cutting tool if stripping is to be done in order to correctly align the stripping disk of the tool during stripping by pivoting on either side of the scoring lines to be produced, therefore with the axis aligned normally to the scoring line. In this way, in the invention a separate pivoting drive for the stripping tool is unnecessary, and moreover there arises the advantage that the same drive can be used selectively for the cutting tool (during scratching) and for the stripping tool (during stripping). Nor is it necessary anymore to prepare a separate program for the stripping tool (grinding wheel) for its movement along the division outline, since the stripping tool with its stripping disk (grinding wheel) can be moved by pivoting, combined with the movements of the carriage along the cutting bridge and the motion of the cutting bridge along the glass cutting table following the division outline, for which the program which was prepared beforehand can be used for dividing the glass sheet into patterns.

The coupling of the stripping tool with the pivoting drive for the cutting tool can take place in different ways. One preferred measure is to selectively couple the stripping tool to a gear wheel which is connected to a shaft which carries the cutting tool and to which a drive motor with a pinion is assigned. This can take place by there likewise being a pinion on the shaft via which the stripping tool is pivotally supported and by the pinion being caused to engage the gear wheel of the cutting tool as necessary.

For this there are various possibilities, for example the entire cutting tool with its shaft is lowered or raised in order to cause the pinion to engage the gear wheel, its preferably proceeding such that the pinion on the pivoting shaft of the stripping tool engages the gear wheel of the cutting tool when the stripping tool has been placed on the glass sheet for a stripping process.

Another possibility consists in supporting the pinion on the pivoting shaft of the stripping tool with the capacity to move, however rotationally coupled so that as necessary the pivoting means for the stripping tool can be coupled to the pivoting means (gear wheel) for the scoring tool by the pinion being pushed along the shaft.

An embodiment of the invention is also considered in which on the shaft of the motor for turning the cutting tool there is another pinion which meshes with a sprocket wheel which is assigned to the stripping tool. In this embodiment it is preferred that the stripping tool when not in use can be raised by a movement perpendicular to the plane of the glass pane off the latter.

In this embodiment there is the advantage that the pinion on the shaft of the motor for adjusting (turning) the cutting tool can remain continuously engaged with the two sprocket wheels. If the stripping tool is not needed, the cutting wheel is raised off the glass pane. Normally it is not disruptive if the grinding wheel (stripping disk) which has been raised off the glass pane is pivoted when the glass pane is being scored.

If for example for reasons of space or construction the area around which the stripping tool can be pivoted is limited, in this embodiment there can be a detachable coupling between the sprocket wheel which is assigned to the stripping tool, and the shaft which can turn around an axis which is perpendicular to the glass sheet and which bears the grinding wheel. If the cutting wheel can continue to pivot, simply the coupling between the shaft which bears the stripping tool and the sprocket wheel which is assigned to the stripping tool is released.

Here it can be provided that the coupling between the sprocket wheel and the shaft which carries the stripping tool can only be engaged in order to produce a rotationally strong connection between the sprocket wheel and the shaft when the stripping disk of the stripping tool is aligned in a certain alignment.

BRIEF DESCRIPTION OF THE DRAWING FIGURES

Other details and features and advantages of the device as claimed in the invention for cutting and stripping of glass sheets will become clear from the following description of two exemplary embodiments which are shown schematically in the drawings.

Figure 2:
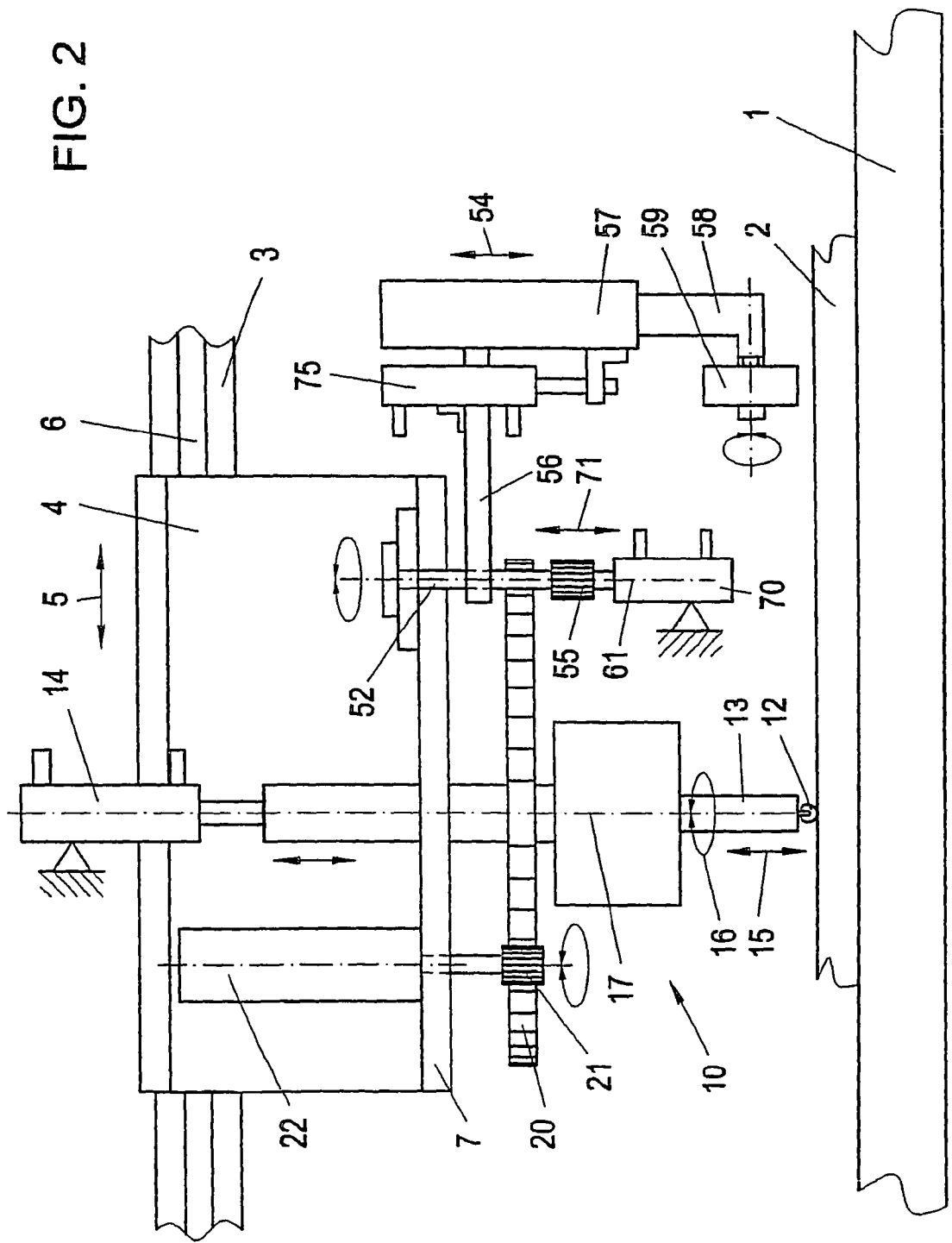
Figure 3:
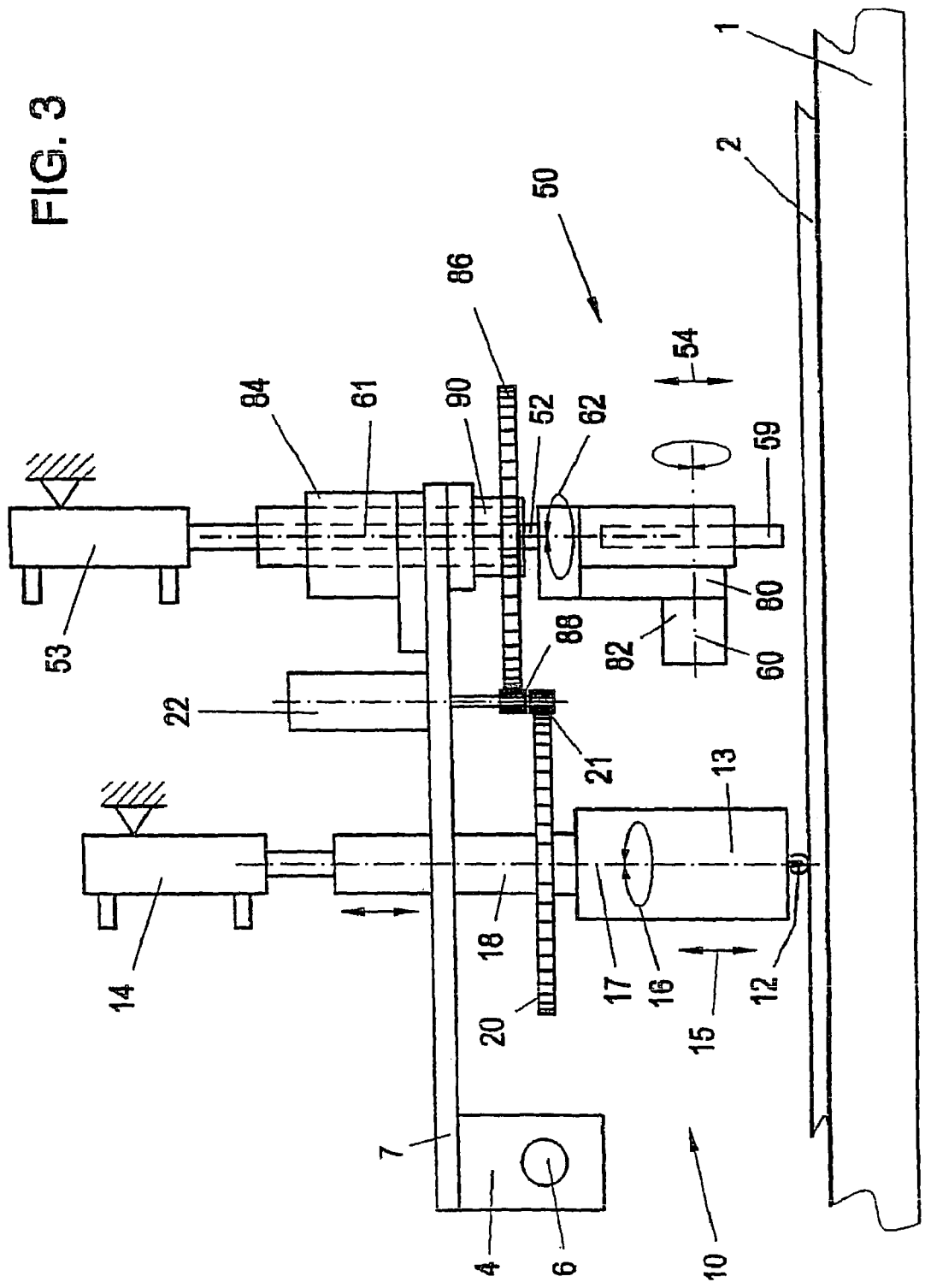

FIG. 1 shows in a side view in part a device for cutting and stripping of glass sheets, FIG. 2 shows another embodiment in a view similar to FIG. 1, FIG. 3 shows a third embodiment of the device as claimed in the invention for cutting and stripping of glass sheets, and FIG. 4 shows an alignment of axes.

DETAILED DESCRIPTION OF THE INVENTION

The device as claimed in the invention is provided on a cutting table, of which FIG. 1 shows only the support top 1 for a glass sheet 2. The cutting bridge 3 which is provided aligned transversely to the lengthwise side of the cutting table is guided to be able to move along the lengthwise sides of the cutting table. On the cutting bridge 3 a carriage 4 is guided which can be moved in the direction of the double arrow 5 via a drive which is not detailed. For example, the carriage 4 is guided on the cutting bridge 3 via round rods 6.

A cutting tool 10 and a stripping tool 50 are mounted on the horizontal plate 7 of the carriage 4 in the embodiment shown in FIG. 1.

The cutting tool 10 has a cutting wheel 12 which can be placed on the top of the glass sheet 2 or raised off it via its holding device 13 by a hydraulic motor 14 in the direction of the double arrow 15.

The cutting wheel 12 can additionally be pivoted around an axis 17 which is normal to the glass pane 2, as is symbolized by the ring arrow 16. This pivoting is necessary to align the cutting wheel 12 such that it is correctly aligned for execution of scoring (X cuts, Y cuts, etc.). In addition, the cutting wheel 12 can be continuously pivoted when scoring lines must be produced for cuts which are not straight, therefore cuts of any curvature (for "shaped panes").

For pivoting of the cutting wheel 12 a gear wheel 20 is connected to its shaft 18. A pinion 21 which is driven by a motor 22 meshes with the gear wheel 20 in order to correctly align the cutting wheel 12 via its shaft 18 for the respective scoring process. Thus, using the cutting wheel 12 a glass sheet 2 which has been fixed in position on the top 1 of a glass cutting table can be scored according to a precomputed division pattern which has been optimized for example by a program, in addition to conventional cuts, such as X cuts (in the direction transversely to the lengthwise extension of the glass sheet) and Y cuts (in the lengthwise direction of the glass sheet), curved cuts for producing shaped panes can also be made. All these movements of the cutting wheel 12 take place by combined movements of the cutting bridge 3 along the top 1 of the glass cutting table, of the carriage 4 along the cutting bridge 3 and by pivoting the cutting wheel 12 around the axis 17.

A stripping tool 50 is mounted on the carriage 4 in the illustrated exemplary embodiment. This stripping tool 50 is located on a plate 51 which is attached to the horizontal part 7 of the carriage 4. The stripping tool 50 is provided with a shaft 52 which is pivotally mounted in the plate 51. The shaft 52 can be adjusted in the direction of the double arrow 54 by a hydraulic motor 53 which like the hydraulic motor 14 is supported for the cutting tool 10 on the carriage 4. A pinion 55 sits on the shaft 52.

An arm 56 which bears the actual stripping tool is connected to the shaft 52. The actual stripping tool in this embodiment consists of a motor 57 with a flange-mounted angular gear 58 and a stripping disk 59 ("grinding wheel") which turns around a horizontal axis 60 when it is driven by the motor 57. The stripping disk 59 is for example a disk with an eraser rubber-like consistency which can be provided with an abrasive material in order to remove a (metal) coating which is provided on the glass sheet 2 (on its top) essentially without abrasively working the glass sheet 2 itself.

In order to remove a coating from a glass sheet 2 along a precomputed division outline on either side of scoring lines still to be produced, the stripping disk 59 of the stripping tool 50 is placed on the glass sheet 2 with the cutting tool 10 raised off the glass plate 2 by the hydraulic motor 53 being actuated accordingly. This motion also moves the pinion 55 down so that it engages the gear wheel 20 for the pivoting drive of the cutting wheel 12. Thus, the stripping tool 50 can be pivoted by the servomotor 22 around a vertical axis 61, as is symbolized by the ring arrow 62.

If stripping takes place using the stripping disk 59 of the stripping tool 50 along the entire division outline, therefore a (metal) coating has been removed from the glass sheet 2 by abrasive working, the stripping disk 59 of the stripping tool 50 is lifted off the glass sheet 2. Then the scoring lines are produced according to the division outline using the cutting tool 10 and the glass sheet 2 is conventionally divided into patterns by breaking as the process continues.

In the embodiment shown in FIG. 2, the shaft 52 to which the arm 56 for the motor 57, the angular gear 58 and the stripping disk 59 is attached is supported, not to be vertically adjustable in the plate 51, but pivotable only around the axis 61. In this embodiment the pinion 55 can be moved in the direction of the axis 61 by a servomotor 70 which is supported on the carriage 4, as symbolized in FIG. 2 (arrow 71), in order to alternately engage the pinion to the gear wheel 20 or to disengage it. To do this, the pinion 55 can be moved in the axial direction relative to the shaft 52, but is rotationally coupled to the shaft 52. The connection of the pinion 55 to the piston of the servomotor 70 is made such that the pinion 55 can turn freely relative to the piston rod of the servomotor 70.

In the embodiment shown in FIG. 2, the assembly with the stripping disk 59 is supported to be adjustable in the direction of the double arrow 54, therefore normally to the glass sheet 2 on the arm 56 using a linear motor 75 in order to alternately place the stripping disk 59 on the glass sheet 2 or to lift it off.

Fundamentally an embodiment is also conceivable in which the stripping tool 50 remains permanently coupled to the pivoting drive 20, 21, 22 for the cutting tool 10 and only the assembly with the stripping disk 59 of the stripping tool 50 can be adjusted normally to the glass sheet 2 in order to place the stripping disk 59 on the glass sheet 2 or to lift it off. In this embodiment, the stripping tool 50 for each pivoting motion of the cutting wheel 12 of the cutting tool 10 is pivoted at the same time, but does not act on the glass sheet 2 with the stripping tool 50 raised, so that this pivoting motion is not inherently disruptive.

In summary, one embodiment of the invention can be described as follows:

In the embodiment shown in FIG. 3, a horizontal plate 7 on which a cutting tool 10 and a stripping tool 50 are mounted is attached to the carriage 4. The cutting tool 10 has a cutting wheel 12 which can be placed on the top of the glass sheet 2 or lifted off it via its holding device 13 by a hydraulic motor 14 in the direction of the double arrow 15. The cutting wheel 12 can turn additionally around an axis 17 which is normal to the glass pane 2 as is symbolized by the ring arrow 16. This turning is necessary to align the cutting wheel 12 such that it is correctly aligned for execution of scoring (X cuts, Y cuts, etc.). In addition, the cutting wheel 12 can be continuously turned when scoring lines for cuts which are not straight, therefore cuts of any curvature (for shaped panes), are to be produced.

For pivoting of the cutting wheel 12 this shaft 18 is connected to a gear wheel 20 with which a pinion 21 meshes which is driven by a motor 22 in order to turn the cutting wheel 12 via its shaft 18 into the alignment which is correct for the respective scoring process, or to continuously turn the cutting wheel 12 when curved or circular cuts are to be made.

The stripping tool 50 of the embodiment of the device as claimed in the invention as shown in FIG. 3 has a stripping disk 59 which can be turned around an axis 60 which is parallel to the plane of the glass sheet 2. To do this a motor 82 which sets the stripping disk 59 into rotation is mounted on the support 80 for the stripping disk 59.

The support 80 for the stripping disk 59 is attached to a shaft 52 which can be turned (ring arrow 62) and raised and lowered (arrow 54) in a guide 84 which is attached to the horizontal part 7 of the carriage 4. For raising and lowering the stripping disk 59 of the stripping tool 50 there is a hydraulic motor 53. Thus, the stripping disk 59 can be placed on a glass sheet 2 for a stripping process, or when not in use can be lifted off the glass sheet 2.

To turn the stripping tool 50 in the direction of the ring arrow 62, there is a sprocket wheel 86 which meshes with a pinion 88 which sits on the shaft of the drive motor 22. The sprocket wheel 86 is connected to the shaft 52 of the stripping tool 50 via a detachable coupling 90. If the coupling 90 is engaged, the stripping tool 50, especially the stripping disk 59, is pivoted by the drive motor 22, as has been described above for the embodiments of FIGS. 1 and 2. When the coupling 90 is released, the gear wheel 86 does turn, but the shaft 52 and thus the stripping disk 59 are not pivoted. This is especially important when the cutting wheel 12 is to be swivelled to an extent, for example by more than 180°, which cannot be done for the stripping tool 50, especially the assembly of the support 80, the motor 82 and the stripping disk 59, for reasons of space/construction, so that the so-called assembly must be separated from the gear wheel 86 by releasing the coupling 90. These swivelling movements of the cutting wheel 12 by more than 180° arise for example when inherently closed, for example round, cuts are to be made, since in these cuts the scoring process is not to be interrupted.

On the cutting bridge 4 of a device for dividing glass sheets 2 into patterns (glass cutting table) there are a cutting tool 10 to which a pivoting drive 20, 21, 22 is assigned, and a tool 50 for removing a coating from a glass sheet 2 with a stripping disk 59. The stripping tool 50 is mounted on the carriage 4 to be able to pivot around an axis 61 which is normal to the glass sheet 2. When the tool 50 is being used to strip a glass sheet 2 along the division outline, therefore in the area on either side of scoring lines which have been or are to be produced in a glass sheet 2, the stripping disk 59 is placed on the surface of the glass sheet 2 and the tool 50 is pivoted around the axis 61 which is normal to the glass sheet 2 using the pivoting drive 20, 21, 22 for the cutting tool 10 in order to correctly align the stripping disk 59. The coupling between the pivoting drive 20, 21, 22 for the cutting tool 10 with the tool 50 for stripping can be alternately released so that when the glass sheet 2 is being scored using the cutting tool 10, the stripping tool 50 is not moved at the same time.

FIG. 4 shows the axis (17) of the cutting tool (10), the axis (61) of the stripping tool (50) and the axis of the shaft of the motor (22) being located in the corner points of a triangle.

The invention claimed is:

1. A device for cutting and stripping of a glass sheet (2), comprising:
    a carriage (4);
    a support surface (1);
    a cutting tool (10);
    a stripping tool (50), the support surface (1), the cutting tool (10) and the stripping tool being located on the carriage (4), the stripping tool (50) being attached via an arm (56) to a shaft (52) which is mounted on the carriage (4) to be able to pivot around an axis (61) normal to the support surface (1);
    a cutting bridge (3) along which the carriage (4) is movable, the cutting bridge (3) being movable along the support surface (1);
    a rotary drive (20, 21, 22) for a cutting wheel (12) assigned to the cutting tool (10), the cutting wheel (12) being able to pivot around the support surface (1) on a normal axis (17), the normal axis (17) around which the cutting wheel (12) can pivot being placed at a distance so that the stripping tool (50) is connected to the rotary drive (20, 21, 22) of the cutting tool (10) by a coupling; and
    a pinion (55) to which the shaft (52) is assigned, the pinion (55) being adjustable in order to selectively engage the pinion (55) to a gear wheel (20) of the pivoting rotary drive (20, 21, 22) of the cutting tool (10), and the pinion (55) can be pivoted, coupled to the gear wheel (20), or decoupled by adjustment in one direction parallel to the axis (61) around which the stripping tool (50) can be pivoted.

2. The device as claimed in claim 1, wherein the coupling between the rotary drive (20, 21, 22) of the cutting tool (10) and the stripping tool (50) can be released.

3. The device as claimed in claim 2, wherein the stripping tool (50) on the carriage (4) is adjustable in the direction (54) normal to the glass sheet (2).

4. The device as claimed in claim 1, wherein the stripping tool (50) on the carriage (4) is adjustable in a direction (54) normal to the glass sheet (2).

5. The device as claimed in claim 4, wherein there is a linear motor (53, 75) for adjusting the stripping tool (50).

6. The device as claimed in claim 1, wherein the pinion (55) is mounted fixed on the shaft and the shaft with the stripping tool (50) attached here can be adjusted in the direction of the axis (61) normal to the support surface (1) by a linear motor (53).

7. The device as claimed in claim 1, wherein the pinion (55) can be moved using a linear motor (70) along the shaft (52), but is rotationally coupled to the shaft (52).

8. The device as claimed in claim 1, wherein a stripping disk (59) is driven by a motor (57) via an angular gear (58).

9. The device as claimed in claim 1, wherein there is a coupling (90) between the shaft (52) of the stripping tool (50) which bears a stripping disk (59) and a gear wheel (86) which is rotationally driven by a motor (22).

10. The device as claimed in claim 9, wherein the gear wheel (86) meshes with a pinion (88) located on the shaft of the motor (22).

11. The device as claimed in claim 10, wherein on the shaft of the motor (22) there are a pinion (21) for the gear wheel (20) of the rotary drive (20, 21, 22) of the cutting tool (10) and another pinion (88) for the gear wheel (86) of the stripping tool (50).

12. The device as claimed in claim 9, wherein the shaft (52) which bears the stripping disk (59) can be raised and lowered (arrow 54) perpendicularly to the plane of the glass sheet (2).

13. The device as claimed in claim 12, wherein a support (80) is mounted on the shaft (52) and the stripping disk (59) is pivotally mounted in the support and wherein the support (80) bears a drive motor (82) for the stripping disk (59).

14. Device as claimed in claim 9, wherein the axis (17) of the cutting tool (10), the axis (61) normal to the support surface (1) and an axis of a shaft of the motor (22) are located in corner points of a triangle.

15. The device as claimed in claim 1, wherein a stripping disk (59) of the stripping tool (50) can be pivoted by 180°.

16. The device as claimed in claim 1, wherein the pinion (55) is mounted fixed on the shaft and the shaft with the stripping tool (50) attached here can be adjusted in the direction of the axis (61) normal to the support surface (1) by a linear motor (53).

17. The device as claimed in claim 1, wherein the pinion (55) can be moved using a linear motor (70) along the shaft (52), but is rotationally coupled to the shaft (52).

18. A device for cutting and stripping of a glass sheet (2), comprising:
- a carriage (4);
- a support surface (1);
- a cutting tool (10);
- a stripping tool (50), the support surface (1), the cutting tool (10) and the stripping tool being located on the carriage (4), the stripping tool (50) being attached via an arm (56) to a shaft (52) which is mounted on the carriage (4) to be able to swing back and forth around an axis (61) normal to the support surface (1);
- a cutting bridge (3) along which the carriage (4) is movable, the cutting bridge (3) being movable along the support surface (1);
- a rotary drive (20, 21, 22) for a cutting wheel (12) assigned to the cutting tool (10), the cutting wheel (12) being able to swing back and forth around the support surface (1) on a normal axis (17), the normal axis (17) around which the cutting wheel (12) can swing back and forth being placed at a distance so that the stripping tool (50) is connected to the rotary drive (20, 21, 22) of the cutting tool (10) by a coupling; and
- a pinion (55) to which the shaft (52) is assigned, the pinion (55) being adjustable in order to selectively engage the pinion (55) to a gear wheel (20) of the rotary drive (20, 21, 22) of the cutting tool (10), and the pinion (55) can swing back and forth, coupled to the gear wheel (20), or decoupled by adjustment in one direction parallel to the axis (61) around which the stripping tool (50) can swing back and forth.

19. The device as claimed in claim 18, wherein the coupling between the rotary drive (20, 21, 22) of the cutting tool (10) and the stripping tool (50) can be released.

20. The device as claimed in claim 18, wherein the stripping tool (50) on the carriage (4) is adjustable in a direction (54) normal to the glass sheet (2).

* * * * *